Nov. 29, 1966   A. W. HANNE   3,288,231
EGG WEIGHING APPARATUS
Filed Jan. 25, 1965   2 Sheets-Sheet 1

INVENTOR.
ALBERT W. HANNE
BY
ATTORNEYS

INVENTOR.
ALBERT W. HANNE
ATTORNEYS

United States Patent Office 3,288,231
Patented Nov. 29, 1966

3,288,231
EGG WEIGHING APPARATUS
Albert W. Hanne, Ottumwa, Iowa, assignor to Big Dutchman, Inc., Zeeland, Mich., a corporation of Michigan
Filed Jan. 25, 1965, Ser. No. 427,620
2 Claims. (Cl. 177—210)

This invention relates to the weighing of discrete individual objects such as eggs, and more particularly to an improved apparatus for automatically weighing such objects at a very high rate of speed while obtaining accurate and consistent results.

The present invention is an improvement of the weighing machine disclosed in application Serial No. 340,229, filed January 27, 1964, and assigned by mesne assignments to the assignee of the present invention.

As was stated in the earlier application just identified, the grading of eggs by weight as the same are moved continuously along a given path is conventionally accomplished by a plurality of independent mechanical scales. Each such scale is responsive to a weight exceeding a certain predetermined amount which differs for each scale, so as to trip or acuate some external mechanism for routing or delivering eggs of that particular weight to a specific storage or transfer area. Thus, such a system which grades eggs according to large, medium and small, for example, would require two scales, the first being responsive to a weight corresponding to the minimum weight of a "large" egg, and the second being responsive to a weight corresponding to the minimum weight of a "medium" egg. Any eggs to which neither of these scales respond would be classed as "small." Such a system is unlikely to actually be encountered in practice, since the normal practice is to break the grades into a greater number of classes; however, the exemplary system serves to illustrate the principles of the present invention.

The main problem encountered in a system such as the above is that it is virtually impossible to assure accurate grading if one also seeks to achieve high grading speeds for the system. Due to the fact that individual eggs vary substantially in shape and contour, even within a given grade, it is extremely difficult to obtain a "smooth" transfer of eggs onto the scale platforms. As a result, a "medium" or even a "small" egg, if not smoothly transferred, may cause the "large" scale to respond, and such an egg would be erroneously rounted to the "large" grade area. This effect may be overcome by providing some type of timing device which prevents the scale from responding until after the egg has been transferred to and maintained for a time upon the scale platform. However, such a timing device can be incorporated within a mechanical scale only at the expense of limiting the capacity of the machine, owing to the fact that the inertia of the parts of a requisite mechanical scale is great enough to cause the damping of oscillations caused by "rough" transfer of an egg to consume an inordinate amount of time. Thus, the machine cannot be operated faster than would allow the eggs to remain on the scale for a length of time sufficient to permit the oscillations to be significantly damped out. Moreover, mechanical scale mechanisms require a number of moving parts which are subject to damage and which are difficult to maintain in clean condition for maximum performance, particularly in view of the fact that egg machines must constantly operate under the assumption that some degree of egg breakage is inevitable.

More recently scales which combine electrical measuring techniques with preferred portions of known mechanical scales have become known. Basically, such eletromechanical devices incorporate a transducing means connected to the moving mechanical members of the scale such that the transducer generates an electrical signal representative of such movements. These signals are used to electrically actuate various indicating devices, and hence the weight of an object can very accurately be measured. Such electromechanical devices are generally preferred over mechanical ones, since they are faster and more accurate than strictly mechanical scales.

Previous electromechanical devices are not without their own limitations, however. For one thing, they have what has grown to become recognized as a typical pronounced tendency to drift during usage, so that in operations where eggs or the like are graded according to weight, the scales do not consistently place the same size eggs in the same predetermined categories during long periods of operation. This result is, of course, unsatisfactory. Further, previous electromechanical weighing devices were operative in only one measuring direction from a predetermined point. That is, each scale would be arranged to detect only those objects having a weight greater than the predetermined value, and the scales were inoperative for objects weighing less than this value. Grading was accomplished through a plurality of such single-action scales, and while such a system could be conceived which would grade in the proper manner, it nonetheless required an unnecessarily large number of individual scale units, since none of them was actually bi-directional.

Further, the problems encountered in weighing a rapid succession of discrete objects such as eggs are somewhat unique in the area of damping oscillations from the mechanical parts of the scale. As has been indicated above, the actual differences in weight between the different long-established size classifications of eggs are very small, and the "rough" transfer of eggs onto the weighing platform causes mechanical oscillations which are likely to introduce errors in weight measurement that are easily enough to cause the scale to improperly grade the succession of eggs by erroneously indicating weights which are different than the true static eight of the eggs alone.

Accordingly, it is a major object of the present invention to provide an improved egg weighing device which assures accurate weighing of eggs under the adverse transfer and other conditions noted, and at very high speed and capacity, by eliminating the characteristic drift problem of previous devices and also by providing improved damping characteristics in the scale.

Another important objective of the invention is to provide an electromechanical weighing device which will operate in a bi-directional, triple-grading manner, which will measure weight above, below, and at a predetermined nominal size, all with consistent high accuracy.

The foregoing objects and advantages, together with other equally desirable features, will become increasingly apparent following consideration of the ensuing specification and its appended claims, especially when taken in conjunction with the accompanying illustrative drawings setting forth a preferred embodiment of the invention.

Briefly stated, the present invention provides an electromechanical weighing apparatus in which resiliently biased suspension elements mount an egg-receiving weighing platform to a rigid external point. The movable portion of a transducing element is connected to the suspension means and platform to move in accordance therewith, and the fixed portion of the transducer is rigidly connected to the said fixed external point by means of a mounting structure which provides a heat sink for the transducer. This controls the operating temperature of the transducer by dissipating the heat produced therein during prolonged periods of operation, and thereby eliminates the drift in operating charateristics which has consistently plagued previous scales of this general nature. Further, the present weighing device includes a damping mechanism which acts between the suspension means and a fixed point provided by the transducer mounting structure, for directly damping out transient and high frequency mechanical oscillations which might otherwise be coupled to the movable transducer element to introduce error, and also for balancing the mechanical portions of the scale by coupling heavy, low-frequency environmental vibrations to all common parts of the mechanism. The present weighing apparatus further includes electrical circuitry for receiving the output of the transducer and producing therefrom an indication of the weight of the object upon the receiving platform. This circuitry is, in conjunction with the transducer means, bi-directional in nature; that is, from a given transducer setting which represents a particular preselected weight, the circuit operates to indicate weights which are both lighter and heavier than the preselected nominal one. Consequently, in many applications the present inventive device will make it possible to realize operating economies, in that its bi-directional triple operation will enable it to replace a pair of the typical unidirectional scale devices.

Figure 1:
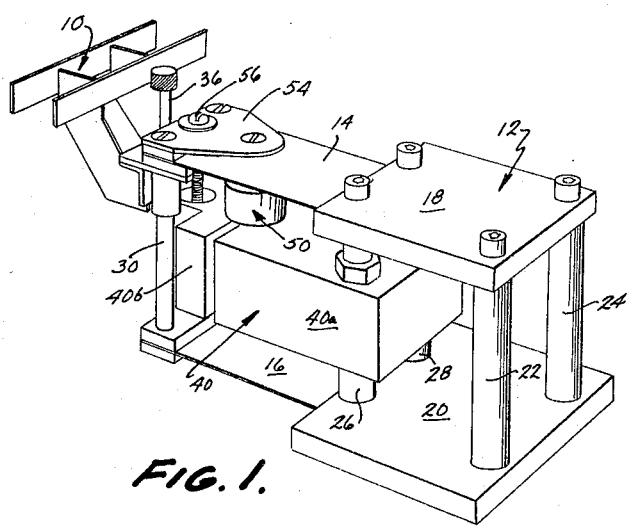
FIG. 1 is a perspective view of the basic mechanical features of the present weighing device.
Figure 2:
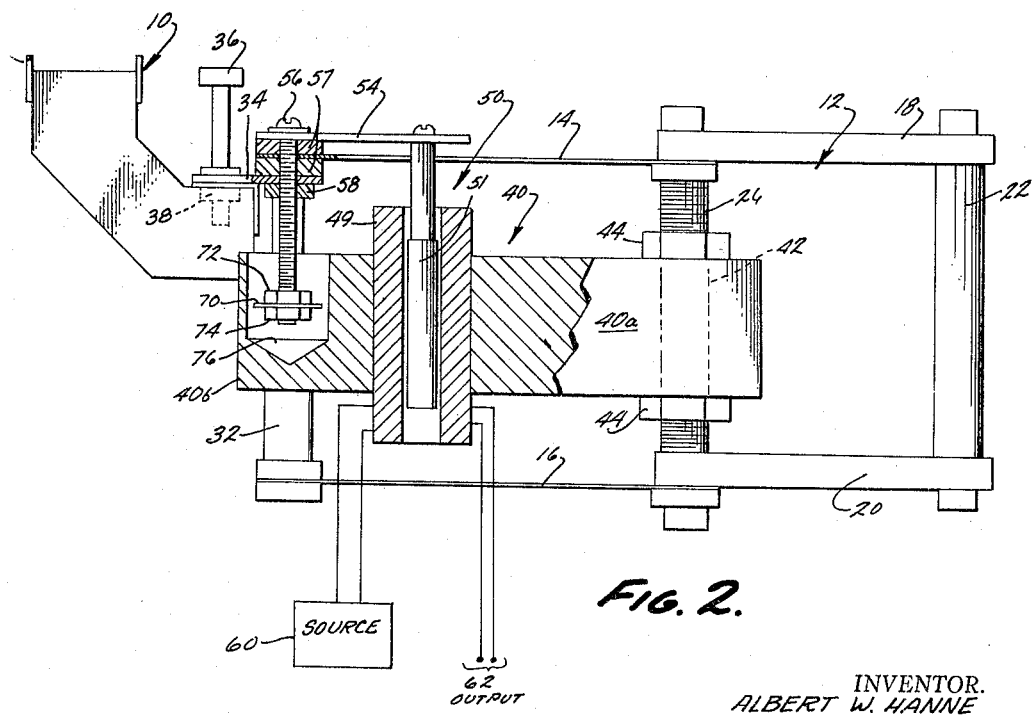
FIG. 2 is an enlarged side elevation of the device of FIG. 1, shown partially in section, portions thereof having been broken away to show additional details.

Referring now in more detail to the drawings, in FIGS. 1 and 2 the present weighing apparatus will be seen to basically comprise an object-receiving platform device 10, a rigid frame member 12 of a desired nature forming a fixed point external from the platform and a pair of suspension elements 14 and 16 which connect the platform 10 to the frame 12. It is to be understood that the frame is basically an accommodation for the other portions of the weighing apparatus, and serves to provide a rigid mount by which the apparatus is connected to a desired grading or other weighing machine, so as to properly position the platform and functionally serve as a rigid mounting point. As here shown, the frame 12 is in the form of a pair of horizontally disposed mounting plates 18 and 20 which are rigidly connected in spaced relation by four post members 22, 24, 26, and 28. Each of the posts are secured in position by cap screws which thread into the posts after passing through the mounting plates.

As FIG. 2 best illustrates, the inner posts 26 and 28 anchor one end of the suspension elements 14 and 16, which thus are vertically spaced in a parallel cantilever arrangement. The suspension elements 14 and 16 are a pair of resilient spring plates, which are interconnected at their ends opposite the frame 12 by a pair of rigid post members 30 (FIG. 1) and 32 (FIG. 2). It is to these posts that the platform 10 is affixed, as by means of the horizontally projecting bracket 34 of FIG. 2, through whose outer end a threaded pin 36 extends to secure the platform in place, as for example by a nut 38 spot-welded or otherwise secured to the platform 10 itself. Consequently, the platform and suspension members 14 and 16 will not move relative to each other, but will move in unison relative to the frame 12. As has been stated, the suspension elements 14 and 16 provide spring plates, which preferably are relatively stiff and which are resiliently flexed and moved by the weight of an egg upon the platform.

As FIGS. 1 and 2 further illustrate, post 26 of the frame assembly 12, in addition to anchoring the suspension spring plates 14 and 16, is threaded over a major portion of its length. A rigid mounting block 40 fits over this post by means of a suitable mounting hole 42 formed through the block. The mounting hole is preferably slightly larger than the post over which it passes, so that the block may easily be raised or lowered by sliding it relative to the post. A pair of anchor nuts 44 are threaded upon the post 26 and tightened against the mounting block 40 to fixedly secure the block in position relative to the mounting post and the frame 12. In addition to merely securing the mounting block 40 to the frame 12, the anchor nuts 44 provide for the vertical adjustment of the mounting block. This is accomplished by first loosening one of the nuts and then tightening the other to bring the block into position against the first nut.

Mounting block 40 is actually composed of a main part 40a and an end cap portion 40b which is rigidly secured to the main part, as by bolts (not shown) passing through the cap portion and threading into the main part. The main portion 40a and the cap portion 40b of the mounting block 40 are semicircularly notched to receive and clamp the body portion 49 of a transducer means 50. In this manner, the transducer body is secured against motion relative to the mounting block 40 and, since the mounting block is fixedly attached to the frame structure 12, the transducer body is also secured relative to the frame. Further, the vertical position of the transducer body may be varied as desired by adjusting the mounting block vertically upon the threaded posts 26 and 28. A rigid bracket 54 is secured to the outer or free ends of the spring plates 14 and 16 by a bolt 56 which extends through the upper plate 14 and through a pair of spacing washers 57 on either side of the plate. Bolt 56 is fastened securely in place by a nut 58 threaded upwardly thereupon against the bottom spacer 57. The rigid bracket 54 extends rearwardly and directly over the transducer 50.

As FIG. 2 best illustrates, the bracket 54 supports a downwardly depending member 51 which comprises the movable member in the transducer 50. The transducer 50 is a position-sensitive apparatus which provides an electrical output representative of movements of the member 51 relative to the body portion 49. This transducer is preferably a differential transformer which, as is well known, is basically a transformer having a movable core by which the inductive coupling between the windings may be varied to vary the output accordingly. Accordingly, the transducer 50 receives an A.C. excitation from a source 60 thereof (FIG. 2) and provides a variable output designated 62, by the appropriate leads indicated. As is known, a differential transformer has a balanced or null condition wherein the movable core member 51 is approximately centered and there is no output. As the core moves in one direction away from this null position the output increases in amplitude and has a first phase condition, and as the movable core moves in the opposite direction from the null position, the output also increases accordingly but is of the opposite phase condition, i.e., 180 degrees out of phase with the first condition. As the representation of FIG. 2 indicates, the movable member 51 constitutes the core of the differential transformer. The respective windings are located in the body portion 49. Vertical movement of the platform 10 and spring plates 14 and 16 caused by the transfer of an egg to the platform will be freely transmitted to the core 51, which will then move in unison with the platform and spring plates relative to the body portion of the transducer and the mounting block structure 40, to produce the electrical signals which have been described.

The present inventor has determined that the most significant cause of the drift in weight measurements of previous devices similar to the present ones is the steady rise in operating temperature which builds up within the body portion 49 of the transducer 50. The steady flow of current through the windings of the device naturally produce heat, and previous electromechanical devices have failed to appreciate that measures must be taken to maintain steady transducer operating temperatures. As a result, the weight measurements produced by previous devices have drifted with operating time such that constant grading results could not be obtained. The present invention recognizes this problem and introduces heat transfer and dissipation means to control the temperature within the transducer. This is accomplished by the mounting block 40, which is to be constructed of a metal such as aluminum which not only is rigid enough to provide the necessary fixed position support for the transducer, but also conducts heat very rapidly to all parts of the block and dissipates this heat from all surfaces thereof. The increase in surface area of the mounting block over the transducer body steadily dissipates heat from the transducer and maintains a constant operating temperature. This prevents the unsatisfactory measurement shifts of previous devices.

It will be noted that the bolt 56 which, as previously noted, secures the transducer mounting bracket 54 to spring plate 14, extends downwardly beyond nut 58 and is provided near its lower end with a baffle plate 70. This is secured in place upon the bolt by a pair of backing nuts 72 and 74 which are tightened upon the bolt against opposite sides of the baffle 70. It will further be noted that the end cap portion 40b of mounting block 40 is provided with a cavity 76 which is directly aligned with the bolt 56 and baffle 70, and which receives these members. The purpose of the cavity 76 is to retain a quantity of viscous damping fluid, preferably a silicon fluid. In this manner, a damping means is added to the weighing apparatus by virtue of the action of the fluid in the cavity against the surface area of baffle plate 70. The damping apparatus so provided serves to couple any heavy mechanical vibration from the frame 12 or elsewhere directly to the weighing platform 10, and thereby to balance such vibrations out of the system, and also to damp out any high frequency excrusion of the scale platform caused by the effect upon the spring plates 14 and 16 of "rough" transfer of eggs onto the weighing platform. Thus, the viscous damping feature insures both more accurate and more consistent weight measurements, and it also increases the measuring speed of the system by reducing the time required to obtain an accurate measurement of an individual object. It is to be particularly noted that the damping means is not merely a separate external element which has been "hung on" an existing scale mechanism, but is an integral portion of the mechanism by virture of being a direct part of the transducer mounting block. The close harmony in operation of the damping means with the rest of the scale mechanism and the transducer obtained in this manner can never be duplicated by a purely external dash pot or the like, since these can at best merely reduce the response of the spring plates and weighing platform, and can never serve the integral balancing function of the present apparatus.

Figure 3:
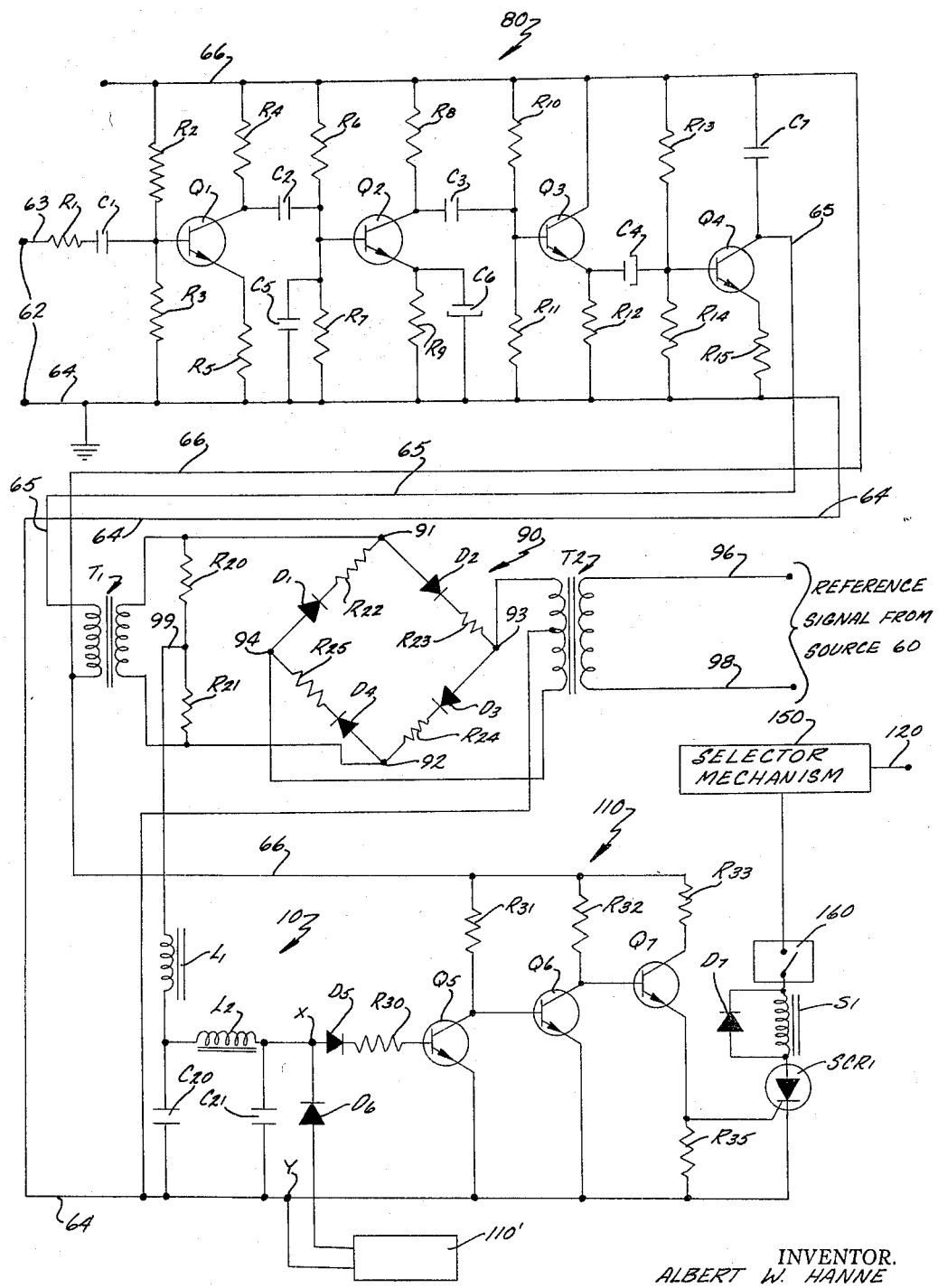
FIG. 3 is a schematic circuit diagram showing the electrical portion of the weighing apparatus.

The phase-varying and amplitude-varying A.C. output 62 of the transducer 50 is coupled to input leads 63 and 64 of the electrical circuitry shown in FIG. 3. This circuitry consists of four basic electronic "blocks." These are an A.C. amplifier 80, a phase-sensitive ring-type demodulator 90, a filter portion 100, and an amplifying and trigger portion 110.

The A.C. amplifier 80 is basically a four-stage capacitance-coupled amplifier having an absolute minimum of phase distortion for signals of the frequency of the transducer input and output. Conductor 64 of the amplifier is at ground potential, conductor 66 provides D.C. operating power from a convenient source, and the output of the amplifier appears on conductor 65 in the final stage. As for the amplifier itself, it includes four transistors designated Q1, Q2, Q3, and Q4, together with their environmental circuitry. The latter includes a signal-developing resistor R1, coupling capacitors C1, C2, C3, and C4, and biasing resistors R2, R3, R5, R7, R8, R9, R11, R12, R14 and R15. It further, includes signal-developing resistors R4, R6 and R10, and trimming capacitors C5, C6, and C7.

The output signal 62 from the transducer is amplified by amplifier 80 and coupled by lead 65 to the primary winding of transformer T1, which forms the input to the demodulator section 90. Transformer T1 couples the amplified signal into the demodulator, and applies it to the upper and lower junctions, designated 91 and 92 respectively, of a diode ring demodulator circuit consisting of diodes D1, D2, D3, and D4, and limiting resistors R22, R23, R24, and R25. A.C. signals from the source 60 of transducer excitation are applied to leads 96 and 98 of the demodulator circuit 90, and hence to the primary winding of transformer T2. The secondary winding of this transformer is center-tapped to ground conductor 64 and the opposite ends of the secondary are connected to terminals 93 and 94 of the demodulator bridge, as shown.

It will be recalled that the output from the transducer 50 will either be of the same phase as the transducer input, or 180 degrees out of phase therewith. Since there is effectively no phase distortion of the transducer output by the amplifier 80, the input signals to the demodulator from transformer T1 will either be in phase or directly out of phase with the reference signals from transformer T2. In this manner, the amplified transducer signals are phase-demodulated against the transducer excitation voltage as a reference. The output of the demodulator 90 is developed across resistors R20 and R21, and is connected by conductor 99 from the junction of these two resistors to the filtering network 100. When the amplified transducer signals are in phase with the reference, this output will consist of positive half-cycles of current, whereas when the transduced signals are shifted out of phase with the reference the output of the demodulator will be negative half-cycles of current. Thus, it will be seen that the demodulator supplies an output voltage whose polarity is directly related to and dependent upon the phase of the transducer output.

The pulsating voltage from the demodulator 90 is coupled to filter network 100 by conductor 99. The filter network may be characterized as a choke-input pi-type L–C network, composed of series inductances L1 and L2 and parallel capacitances C20 and C21. The purpose of this network is to smooth the pulsating demodulator output by removing any ripple frequency from the reference voltage, and also to filter out any high-frequency ripple or transient spikes introduced into the transduced signal by short-period mechanical vibrations of the weighing platform 10 and spring plates 14 and 16 resulting from "rough" egg transfer to the platform, and egg surface roughness or force unbalance caused by a shifting or rolling egg. The resulting filtered signal is of a relatively smooth unidirectional character, and may either be positive or negative in nature depending upon the phase of the transducer output.

The filter output voltage is present at circuit points X and Y, and is applied to diodes D5 and D6. The action of these diodes will be to block negative voltages from network 110 while passing positive voltages thereto, and to block positive voltages from a functionally duplicate triggering network 110′ while passing all negative voltages thereto. The triggering network 110 which is illustrated in detail thus operates for positive voltages, and will be described in these terms, although it is to be expressly noted that a directly analogous circuit such as is indicated by the block 110′ connected to circuit points X and Y in the manner shown will operate in the same manner upon the negative voltages produced by the demodulator. Such a circuit 110′ need only be the functional equivalent of circuit 110, with the polarity of the various components being reversed, as is well known.

Signals from the demodulator of a positive nature are, in accordance with the foregoing, coupled by resistor R30 into the triggering network 110, and are applied to the base of transistor Q5 thereof. The triggering network itself consists basically of a three-stage direct current amplifier comprising transistors Q5, Q6, and Q7, which are direct-coupled to each other. The output of this amplifying section is developed across emitter resistor R35 of transistor Q7, and is used to avalanche or trigger a silicon control rectifier SCR1, or equivalent device. The latter is the means by which a selector mechanism is actuated to effect the grading of the continuing succession of eggs which are constantly being individually weighed by the present invention. That is, as the previously-filed application Serial No. 340,229 identified at the outset of this specification has disclosed, and as is set forth in Patent No. 2,961,087 and application Serial No. 61,585 (filed October 10, 1960), now Patent No. 3,135,386, the preferred environment for a weighing device such as is herein disclosed comprises a conveying mechanism which continuously supplies eggs to the weighing platform, and, depending upon the weight which is measured for each particular egg, the eggs are either continued onward by the conveying mechanism or are deflected to one or more auxiliary conveying members which each represent a graded weight category.

Accordingly, the required supply voltage for actuating a desired selector mechanism is impressed upon terminal 120, and the triggering of the control rectifier SCR1 completes a path for this excitation through a desired selector mechanism 150. For exemplary purposes, an additional selector is shown in circuit with terminal 120 and the control rectifier, in the form of a solenoid S1, since this is a very convenient type of selector and is what is indicated in the said application Serial No. 340,229, of which the present invention is an improvement. In connection with the latter type of selector, a diode D7 is shown connected in shunt with the solenoid coil, for purpose of dissipating the energy which will be stored in this coil upon actuation thereof and subsequent opening of the control rectifier switch. The opening of this circuit may be accomplished by a timer switch 160 connected in series with the control rectifier and power terminal 120. This is a conventional device which may be set to open after a current flow has been established through it for a selected time interval. Opening of the timer switch 160 of course de-avalanches the control rectifier to place the selecting mechanism power circuit back in its original condition, in which it awaits a further triggering impulse.

OPERATION

Having now completely described the structure and circuitry of the present invention, and having also described certain operative functions thereof, the manner of assembly should be quite apparent and an exemplary cycle of operation is as follows:

An individual egg or other object to be weighed is brought to the platform 10 by the desired automatic conveying equipment, which rapidly transfers individual eggs onto and off from the platform. In order to utilize the present weighing device to its fullest potential, the mounting block 40 of FIGS. 1 and 2 is adjusted vertically to position the body portion 49 of transducer 50 so that when the weighing platform 10 is empty and there is no egg thereupon, the movable core member 51 of the transducer is displaced from its balance or null position such that the transducer provides a continuous output signal. This signal will be of one or the other of the phase conditions described and it is assumed for purposes of discussion that this is the in-phase condition. Accordingly, this signal is coupled through the amplifier, demodulator, filter, and triggering network 110, and initially acts to trigger the control rectifier and the preferred selector mechanism.

As eggs are rapidly transferred to and from the platform 10, the movable transducer core member 51 moves relative to the transducer body 49 according to the amount that the weight of each individual egg displaces the spring plates 14 and 16 from the position in which their stiffness ordinarily holds them. Eggs in the light-weight category (i.e., "small") will move transducer member 51 toward its balanced or null position, "medium" size eggs will move the member 51 directly into the null position, and heavy or "large" eggs will move the member beyond the null position into the domain of opposite phase transducer signal conditions. In the first instance, i.e., light-weight "small" eggs, the output signals of the transducer retain the same general character as before. That is, their phase may shift slightly, but it is not actually reversed. Consequently, the demodulating network 90 continues to receive signals of the in-phase condition assumed for the first transducer position, and so continues to produce output signals of a positive polarity. These signals again cause triggering network 110 to actuate control rectifier SCR1 in the same manner as previous, and consequently the solenoid S1 or selector mechanism 150 controlled thereby acts to direct the "small" or light-weight eggs in a first desired manner or mode.

If the next egg placed upon the weighing platform is assumed to be of a "medium" weight, it will cause movable transducer member 51 to be placed in its balanced position, in which the transducer output is nulled. When this occurs, the demodulator network 90 produces no output signal at all, and consequently neither of the triggering networks 110 or 110' are actuated. Therefore, the previous condition of selector mechanism 150 is interrupted, and the "medium" size egg will be moved onward by the automatic conveying member and directed thereby in a second predetermined mode.

When a "large" size egg is placed upon the platform 10, the transducer core 51 is moved downward beyond the balanced position and into the second domain of transducer operation. Accordingly, the transducer now produces an output signal of opposite phase, and when this signal is amplified and supplied to the demodulator network, the demodulator produces a direct voltage of opposite or negative polarity. This signal is filtered and smoothed by network 100 in the same manner as are positive signals, but due to the blocking action of diode D5 and the conducting action of diode D6, the filtered negative signal is directed to triggering network 110' and prevented from reaching network 110. Consequently, the duplicate selector mechanisms included in network 110' are actuated, and this causes the "large" egg to be directed in a third predetermined mode.

In accordance with the foregoing, it will be apparent that the present weighing apparatus actually provides a triple grading operation as a result of its bi-directional weight-measuring capabilities, which latter term when used throughout the present specification or claims is intended to denote the dual ranges of transducer operation and the triple grading function made possible thereby. The present invention thus simplifies and provides economies in the design of automatic grading apparatus, since in effect it is able to take the place of two or even three of the previous scales. Moreover, the operation of the present weighing apparatus is very considerably improved over previous electromechanical devices due to the efficacious solution of the drift problem described above, and also due to the improved damping feature for eliminating errors caused by sharp transient scale deflections or undamped high-frequency deflections.

The many desirable features of the present weighing apparatus, as disclosed in the preferred embodiment thereof illustrated and described herein, may cause others skilled in the art to which it pertains to conceive of various modifications and alterations in structural details and particularities which nonetheless are based upon the identical concept disclosed herein. All such variations and modifications as incorporate the spirit of the present invention are to be considered as included in the scope of the claims appended below, unless these claims by their language expressly state otherwise.

I claim:

1. Apparatus for automatically measuring the weight of individual eggs or like objects, comprising in combination: a receiving platform structure for restingly supporting the objects to be weighed; resiliently biased suspension means connecting said platform to a fixed external frame and extending therebetween; said suspension means arranged to move away from its normal biased position in response to the weight of an object upon said platform; an electromechanical transducer having a body portion and a member movable relative to the said body to produce electrical signals representative of and having a known relationship to said relative motion; means connecting said movable transducer member to said suspension means and platforms; a mounting member comprising a substantially solid block of heat-conductive material securable to said frame, extending toward said platform, and arranged to at least partially engirdle said transducer body to fixedly mount the same; said mounting member acting as a heat transfer and dissipation structure for controlling the operating temperature of the transducer; said mounting member block defining a well for containing a viscous damping liquid; said suspension means having a member connected thereto and extending into said well, such that the movements of said suspension means in response to the weight of an object upon said platform are damped by said member moving within said damping fluid; and means electrically connected to said transducer for producing an indication of the weight of the object on the platform from said electrical signal representative thereof.

2. The apparatus defined in claim 1, wherein said well is located in direct vertical alignment with the junction of said suspension means and said platform, whereby optimum damping is achieved.

References Cited by the Examiner

UNITED STATES PATENTS

| | | | |
|---|---|---|---|
| 2,623,741 | 12/1952 | Broekhuysen | 177—145 X |
| 2,763,457 | 9/1956 | Gregory | 177—122 X |
| 2,940,747 | 6/1960 | Eder et al. | 177—210 |
| 3,017,026 | 1/1962 | Thompson | 177—52 X |
| 3,080,936 | 3/1963 | Sher et al. | 177—210 |
| 3,107,743 | 10/1963 | Knobel | 177—117 |
| 3,108,647 | 10/1963 | Harmon et al. | 177—1 |
| 3,112,805 | 12/1963 | Williams | 177—46 |
| 3,119,457 | 1/1964 | Thompson et al. | 177—145 |
| 3,133,606 | 5/1964 | Thomson | 177—210 |
| 3,182,495 | 5/1965 | Johnson | 177—210 X |

RICHARD B. WILKINSON, *Primary Examiner.*

S. J. TOMSKY, *Examiner.*